United States Patent
Cochimin

[11] Patent Number: 5,925,825
[45] Date of Patent: Jul. 20, 1999

[54] CLAMP AND CUP SECURING STRAIN GAUGE CELL ADJACENT PRESSURE TRANSMITTING DIAPHRAGM

[75] Inventor: Jimmy Cochimin, Fort Wayne, Ind.

[73] Assignee: Franklin Electric Co., Inc., Bluffton, Ind.

[21] Appl. No.: 08/782,835

[22] Filed: Jan. 13, 1997

Related U.S. Application Data

[63] Continuation of application No. 08/318,220, Oct. 5, 1994, abandoned.

[51] Int. Cl.$^6$ .................................. G01L 9/04; G01L 7/08
[52] U.S. Cl. .................................................. 73/726; 73/723
[58] Field of Search ............................. 73/715, 723, 724, 73/725, 726, 727, 720

[56] References Cited

U.S. PATENT DOCUMENTS

| | | |
|---|---|---|
| 1,686,688 | 10/1928 | Fachheimer ........................ 73/715 |
| 1,818,132 | 8/1931 | Held . |
| 2,440,981 | 5/1948 | Smith . |
| 2,667,626 | 1/1954 | Blancher . |
| 2,964,941 | 12/1960 | Marsh et al. . |
| 3,013,186 | 12/1961 | Jones . |
| 3,044,402 | 7/1962 | Kreuter . |
| 3,136,924 | 6/1964 | Futral et al. . |
| 3,141,998 | 7/1964 | Silkman . |
| 3,370,554 | 2/1968 | Thorpe, Sr. . |
| 3,466,978 | 9/1969 | Carlstedt . |
| 3,551,071 | 12/1970 | Hoover . |
| 3,551,072 | 12/1970 | Zimmerly . |
| 3,685,926 | 8/1972 | Blum . |
| 3,692,430 | 9/1972 | Timmons . |
| 3,702,742 | 11/1972 | Russell . |
| 3,719,860 | 3/1973 | Lawrence . |
| 3,814,877 | 6/1974 | Alvarez . |
| 3,855,515 | 12/1974 | Hutchins, Jr. . |
| 3,985,467 | 10/1976 | Lefferson . |
| 4,037,045 | 7/1977 | Beriger et al. . |
| 4,051,509 | 9/1977 | Beriger et al. . |
| 4,081,621 | 3/1978 | Hartley . |
| 4,093,971 | 6/1978 | Chu et al. . |
| 4,102,394 | 7/1978 | Botts . |
| 4,120,019 | 10/1978 | Arii et al. . |
| 4,128,006 | 12/1978 | Grabow . |
| 4,145,161 | 3/1979 | Skinner . |
| 4,155,402 | 5/1979 | Just . |
| 4,160,139 | 7/1979 | Johnston . |
| 4,196,775 | 4/1980 | Groh . |
| 4,204,246 | 5/1980 | Arii et al. . |
| 4,225,290 | 9/1980 | Allington . |
| 4,247,260 | 1/1981 | Schonwald et al. ................ 417/38 |
| 4,257,395 | 3/1981 | Wieder . |
| 4,277,227 | 7/1981 | Jenkins ............................... 417/63 |

(List continued on next page.)

FOREIGN PATENT DOCUMENTS

| | | |
|---|---|---|
| 0004056 | 9/1979 | European Pat. Off. . |
| 2373912 | 7/1978 | France . |
| 1548024 | 7/1979 | United Kingdom . |
| 1592286 | 7/1981 | United Kingdom . |

*Primary Examiner*—Joseph L. Felber
*Attorney, Agent, or Firm*—Marshall, O'Toole, Gerstein, Murray & Borun

[57] ABSTRACT

Apparatus comprising a flow carrier connectable in a liquid flow system including an electric motor-pump unit and a conduit for conveying a pumped liquid to a liquid utilization apparatus. The flow carrier is connectable in the conduit and includes an opening which exposes the liquid flowing through the carrier. A heat sink or cold plate is located on the carrier over the opening, the heat sink covering the opening and having a wet side exposed to the liquid. The heat sink further includes a dry side, and heat generating control components are secured to the dry side. A sensor is also mounted on the heat sink and responds to a characteristic, such as the pressure, of the liquid. The sensor and the control components are operable to control the motor-pump unit. In a domestic water supply system, for example, the liquid utilization apparatus includes the plumbing in a building. In a gasoline supply system, the liquid utilization apparatus comprises a gasoline dispenser.

15 Claims, 11 Drawing Sheets

U.S. PATENT DOCUMENTS

| | | |
|---|---|---|
| 4,281,968 | 8/1981 | Akers . |
| 4,284,943 | 8/1981 | Rowe . |
| 4,329,120 | 5/1982 | Walters . |
| 4,344,741 | 8/1982 | Taki . |
| 4,370,098 | 1/1983 | McClain et al. . |
| 4,394,862 | 7/1983 | Shim . |
| 4,396,353 | 8/1983 | McDonald . |
| 4,397,610 | 8/1983 | Krohn . |
| 4,433,219 | 2/1984 | Dietz . |
| 4,442,953 | 4/1984 | Miyamoto et al. . |
| 4,462,758 | 7/1984 | Speed . |
| 4,507,053 | 3/1985 | Frizzell . |
| 4,532,893 | 8/1985 | Day et al. . |
| 4,600,844 | 7/1986 | Atkins . |
| 4,624,309 | 11/1986 | Schnatzmeyer . |
| 4,627,243 | 12/1986 | Schaub . |
| 4,660,638 | 4/1987 | Yates, Jr. . |
| 4,664,185 | 5/1987 | Barnard . |
| 4,678,404 | 7/1987 | Lorett et al. . |
| 4,686,439 | 8/1987 | Cunningham et al. . |
| 4,718,824 | 1/1988 | Cholet et al. . |
| 4,733,152 | 3/1988 | Allington . |
| 4,741,208 | 5/1988 | Vandevier . |
| 4,795,314 | 1/1989 | Prybella et al. . |
| 4,834,624 | 5/1989 | Jensen et al. . |
| 4,840,068 | 6/1989 | Mayhew, Jr. . |
| 4,841,404 | 6/1989 | Marshall et al. . |
| 4,874,294 | 10/1989 | Karg . |
| 4,965,415 | 10/1990 | Young et al. . |
| 4,965,697 | 10/1990 | Mosser et al. . |
| 4,987,953 | 1/1991 | Hedstrom . |
| 5,015,151 | 5/1991 | Synder, Jr. et al. . |
| 5,040,126 | 8/1991 | Allington . |
| 5,064,347 | 11/1991 | LaValley, Sr. . |
| 5,138,414 | 8/1992 | Shinohara . |
| 5,145,323 | 9/1992 | Farr . |
| 5,162,624 | 11/1992 | Duksa . |
| 5,197,859 | 3/1993 | Siff . |
| 5,222,867 | 6/1993 | Walker, Sr. et al. . |
| 5,238,369 | 8/1993 | Farr . |
| 5,240,380 | 8/1993 | Mabe . |
| 5,244,350 | 9/1993 | Yang . |
| 5,282,722 | 2/1994 | Beatty . |
| 5,392,653 | 2/1995 | Zanger et al. ............................ 73/756 |

CLAMP AND CUP SECURING STRAIN GAUGE CELL ADJACENT PRESSURE TRANSMITTING DIAPHRAGM

This is a Continuation of U.S. application Ser. No. 08/318,220, filed Oct. 5, 1994, now abandoned.

FIELD AND BACKGROUND OF THE INVENTION

This invention relates generally to a pumping or liquid flow system, and more particularly to such a system including at least one heat generating control component for a motor-pump unit and apparatus for cooling the control component, and to apparatus for sensing the pressure of the liquid.

Pumping systems including electric motor-pump units are well known and in common use. Examples include residential water supply systems and gasoline dispensing systems in service stations. A typical water supply system includes a motor-pump unit in a well, a water pipe connected to the unit and extending out of the well to a pressure tank, and a control that senses the water pressure in the tank and controls the unit to maintain the pressure in a selected pressure range.

Traditionally mechanical pressure gauges are used to monitor the flow pressure through such a system. Normally these pressure gauges are mounted on flow pipes whose pressures are to be monitored, using pipe stands or stubs. One popular method of mounting is to provide a bored hole in the pipe, the hole is then threaded, and then a small pipe stand or stub having male threads at one end and a pressure gauge on the opposite end is screwed into the hole. Flow pressure is transmitted to the pressure gauge through the pipe stub to the pressure gauge.

There are numerous commercially available pressure sensors for use with pipe stubs. Most of these pressure sensors incorporate a chamber having a diaphragm with an inlet on one side of the diaphragm and an outlet on the other side of the diaphragm. The pressure sensing inlet normally has female threads for receiving male threads of the pipe stub and a narrow passage filled with a liquid, such as oil, is on the other side of the diaphragm. Water pressure in the pipe causes movement of the diaphragm which, in turn, moves the liquid in the stub on the other side of the diaphragm. Movement of this liquid in the narrow passage causes movement of an indicator to monitor pressure in the pipe.

In the foregoing arrangement the small measuring passage located above the diaphragm often must be filled with oil. This presents a manufacturing problem because such a narrow passage is very difficult to fill with oil or any other liquid without leaving an air bubble therein. In order to properly fill such a gauge with the liquid needed for its functioning, it is therefore necessary first to apply a vacuum to the passage. It is an advantage of this invention that a pressure sensing mechanism is provided for a motor-pump system which can be easily mounted and filled but yet does not require the use of a filling oil and the need for pulling a vacuum.

Some pressure sensor installations require on-site opening of a pipe wall on which the pressure gauge is installed. For example, some require holes in the walls of the pipes and some require protrusions in the walls of the pipes. Such operations are expensive and difficult to incorporate. Another advantage of this invention is that a pressure sensing mechanism is provided which when installed becomes in-line with the pipe line and is relatively inexpensive to manufacture and install.

One prior art device for pipe pressure sensing comprises a part that defines a hollow chamber which is fastened onto a pipe to clamp a diaphragm between the pipe and a portion of the chamber unit surrounding a pressure inlet opening into the chamber. The diaphragm has a round, sensing protrusion with a sensing tip on an outer end thereof, which extends outwardly from one side of the diaphragm and extends through a round hole in the pipe so as to communicate the pressure in the pipe to the chamber. Although this design presents some improvement over the others, it also utilizes a mechanical interface among liquid, diaphragm, and liquid again to convey the pressure in the pipe to the gauge. It is another advantage of the present invention that it includes a mechanical-electrical transducer which more accurately measures the pressure in a motor-pump system.

Various types of pipe pressure sensors can only be used with specific types of pipe, but it is an advantage of this invention that a pipe pressure sensor is provided which can be used with various types of pipe including both plastic and metal pipes.

Control units for pump-motor units including electronics are typically cooled by air cooling through a metallic radiating panel used as a heat sink or a cooling plate. Various types of stock heat sinks are commercially available. Due to the low convective ability of air cooling, the size of such heat dissipating devices is relatively large compared with the overall size of the control package itself. The broad concept of cooling electrical devices by means of a flowing medium was introduced some time ago. In one particular design a closed recirculation cooling system was developed to cool electrodes at different electrical potentials. An advantage of the present invention is that the size of packaging is reduced by using a liquid cooling medium in lieu of the well known air cooling method.

In another prior art design, a printed circuit board package for high density packaging includes electronic circuit components cooled by a liquid cooled cold plate or heat sink. A circulating coolant is also included. A compliant interface including a heat conductive and electrically insulative paste between the cold plate and the circuit components is provided. The paste, which flows like a highly viscous liquid, is used in conjunction with a deformable thin film to compensate for any variations or irregularities so as to conform with the surfaces of the individual circuit packages. An objective of the present invention is to utilize a flow medium of the motor-pump system as a coolant to remove the heat generated by the electrical components, by incorporating a heat sink in the motor-pump system that is cooled directly by the liquid medium in the system, and to avoid the use of any deformable fill or heat conductive paste for mounting the electrical components.

It is a further general object of the present invention to provide a compact system including a pressure sensor and a heat sink in one integral module, thus making the module easy to install in a motor-pump system using only ordinary plumbing tools.

SUMMARY OF THE INVENTION

Apparatus constructed in accordance with the present invention comprises a flow carrier connectable in a liquid flow system including an electric motor-pump unit and a conduit for conveying a pumped liquid to a liquid utilization apparatus. The flow carrier is connectable in the conduit and includes an opening which exposes the liquid flowing through the carrier. A heat sink or cold plate is located on the carrier over the opening, the heat sink covering the opening and having a wet side exposed to the liquid. The heat sink further includes a dry side, and heat generating control components are secured to the dry side. A sensor is also mounted on the heat sink and responds to a characteristic, such as the pressure, of the liquid. The sensor and the control components are operable to control the motor-pump unit. The invention further comprises a novel pressure sensor including a diaphragm having a seal.

In a domestic water supply system, for example, the liquid utilization apparatus includes the plumbing in a building. In a gasoline supply system, the liquid utilization apparatus comprises a gasoline dispenser.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Figure 1:
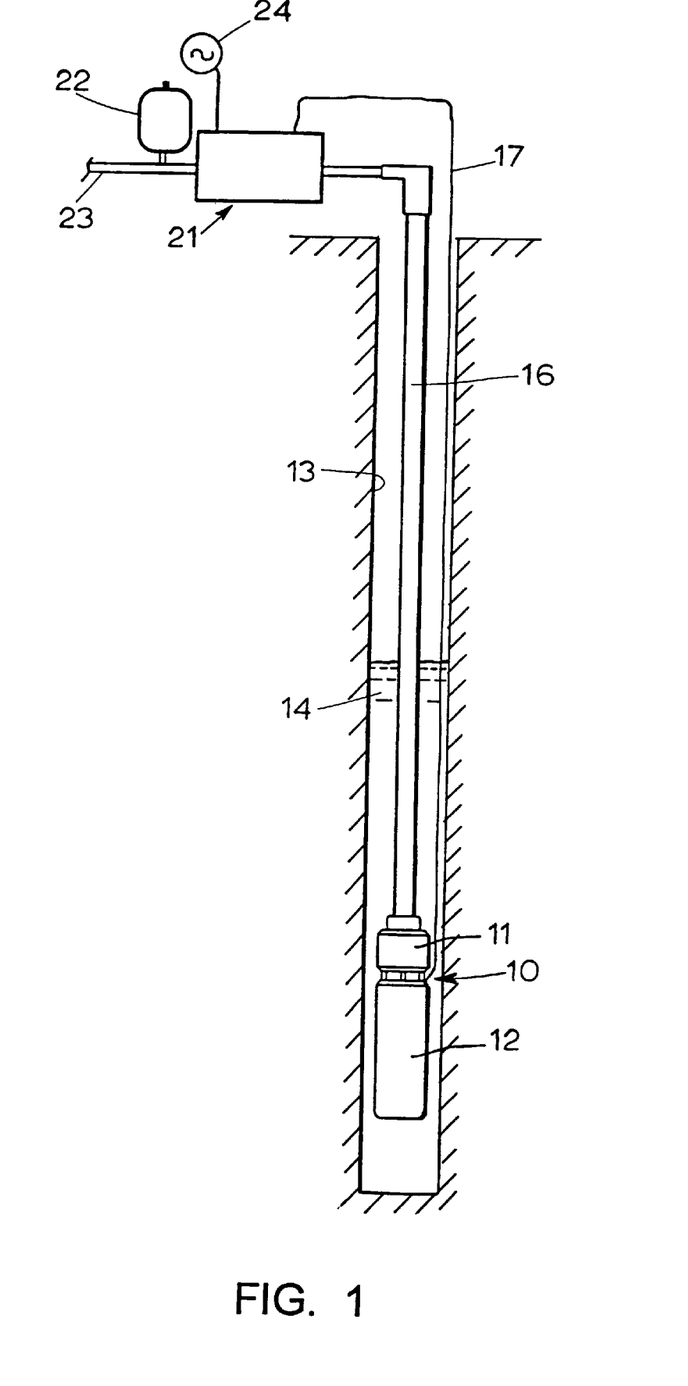
FIG. 1 is a schematic illustration of a domestic water supply system including apparatus incorporating the invention.

While FIG. 1 illustrates a domestic water supply system, it will be apparent that the invention may also be useful in other areas. The water supply system includes a unit 10 including a pump 11 driven by an electric motor 12. The unit 10 is located in a well 13 containing water 14. The unit 10 is suspended in the well by a pipe 16 which also conveys the pumped water to the ground surface. A drop cable 17 connects electric power to the motor 12.

At the surface, and normally within a home in a domestic water supply system, is located a control unit 21 that is connected to the pipe 16, as will be described. The pipe 16 is connected to fill a pressure tank 22 and to supply water to a pipe 23 of the plumbing of the residence. The cable 17 is also connected to the control unit 21, and the unit 21 controls the supply of electrical power from a typical AC power supply 24 such as a 220 volt, 60 cycle supply.

Figure 2:
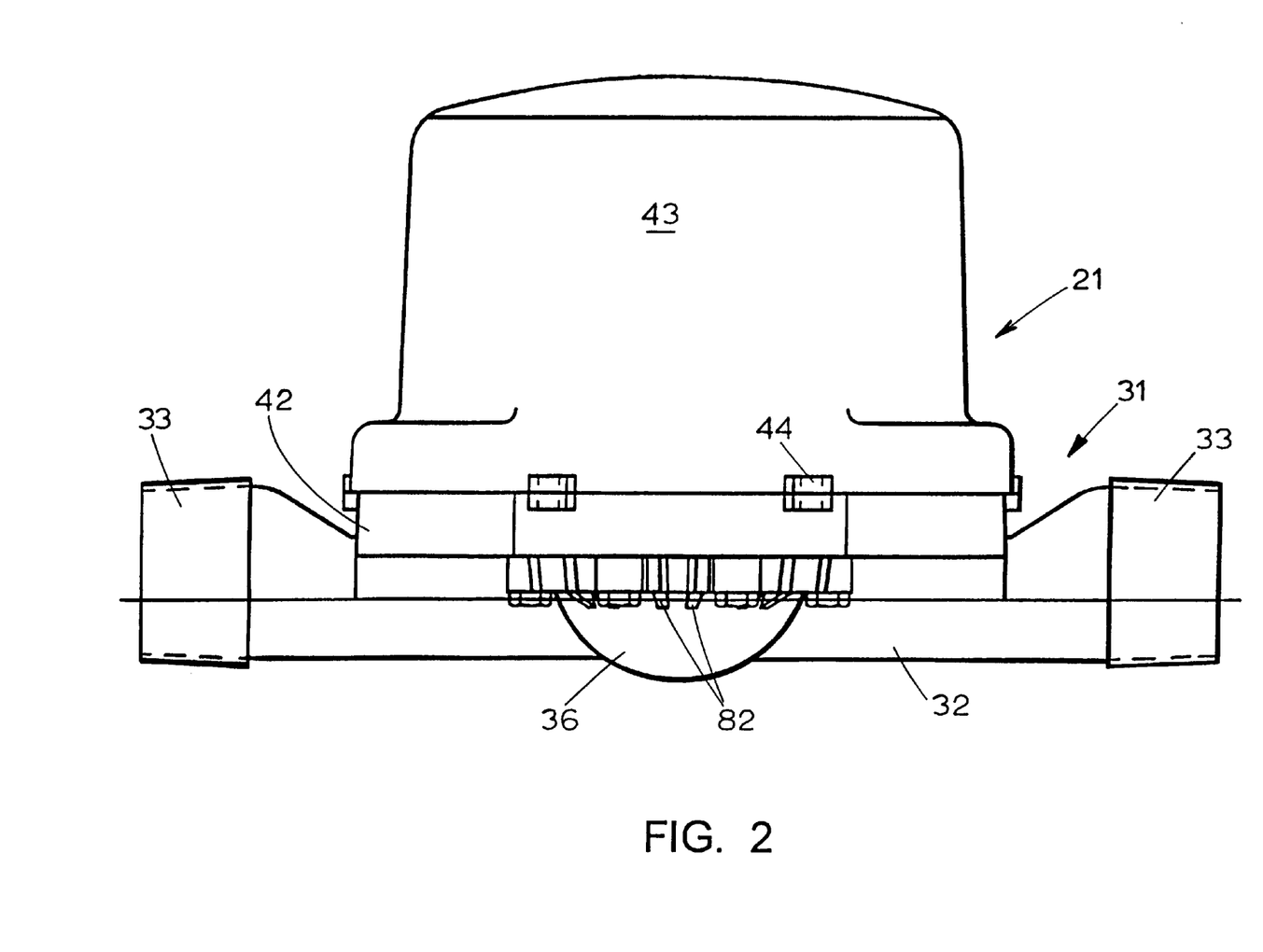
FIG. 2 is an elevational view of a flow carrier of the apparatus.
Figure 3:
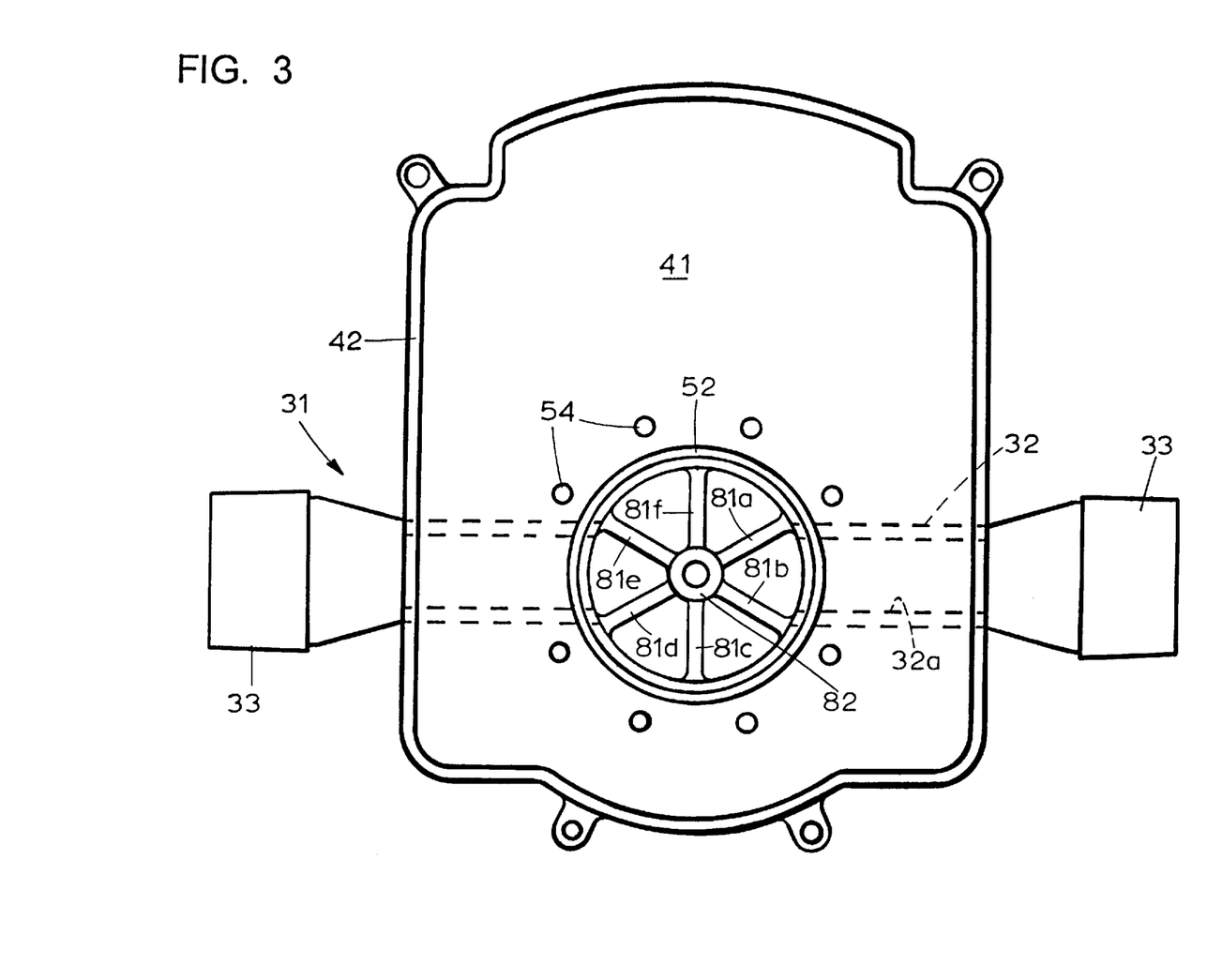
FIG. 3 is a plan view of the flow carrier.
Figure 4:
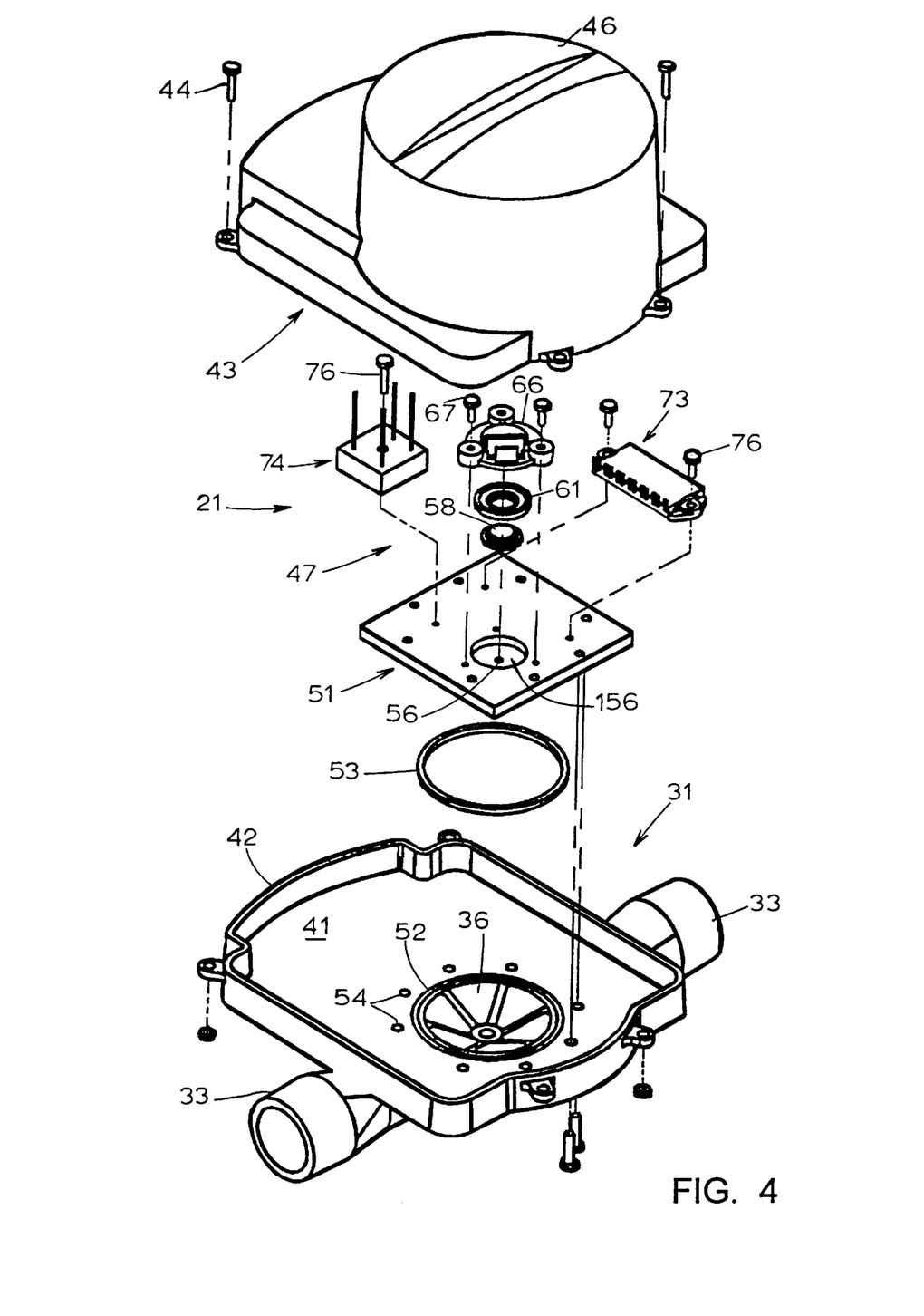
FIG. 4 is an exploded perspective view of the carrier.
Figure 8:
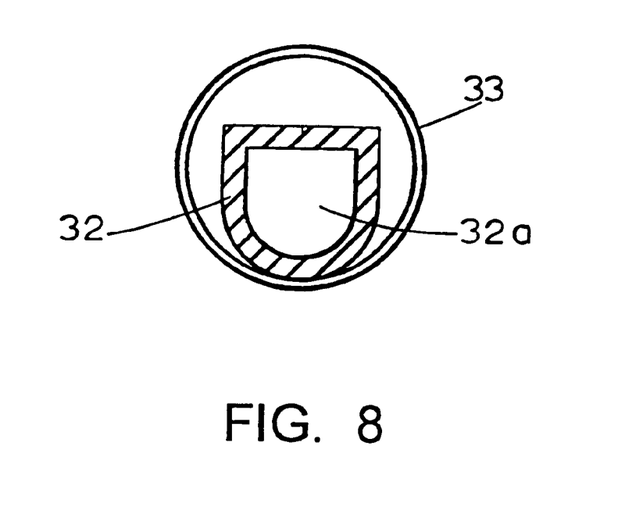
FIG. 8 is a sectional view taken on the line 8—8 of FIG. 6.
Figure 9:
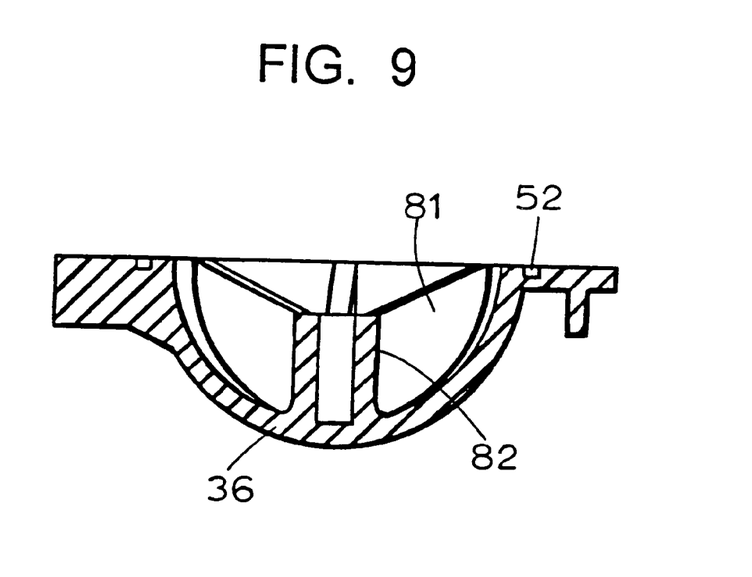
FIG. 9 is a sectional view taken on the line 9—9 of FIG. 6.

With reference to FIGS. 2, 3 and 4, the control unit 21 includes a flow carrier 31 which is connected between the pipes 16 and 23. The carrier 31 includes a conduit 32 (see FIG. 8) including threaded couplings at its ends 33 for connections between the pipe 16 and the pipe 23, and it forms a flow passage 32a between the ends 33. At approximately the center of the carrier 31, the conduit 32 is enlarged to form a generally semi-spherical dome or bulb 36 which is solid on the underside (as seen in FIGS. 2 and 4) and has a flat upper side with an opening therein. Between the bulb 36 and each of the ends 33, the conduit 32 is generally rectangular and has a flat side that is substantially coplanar with the flat upper side of the bulb. The ends 33 are enlarged and threaded for coupling with the pipe 23.

In the example of the invention illustrated in FIGS. 2–4, the carrier 31 includes a plate 41 which is formed integrally with the flat upper sides of the conduit 32 and the bulb 36. The carrier 31 may be formed of a cast or molded metal or suitable plastic such as a polymer, for example. As shown in FIG. 4, the opening in the upper side of the bulb 36 appears as a circle in the plate 41. An upwardly turned flange or rim 42 is formed around the periphery of the plate 41, and a cover 43 fits around the rim 42 and is fastened by bolts 44 to the carrier 31. The cover 43 is enlarged as indicated at 46 in the area above the bulb 36, and the parts 41 and 43 form an enclosure for a control package 47 including heat generating electronics.

Figure 5:
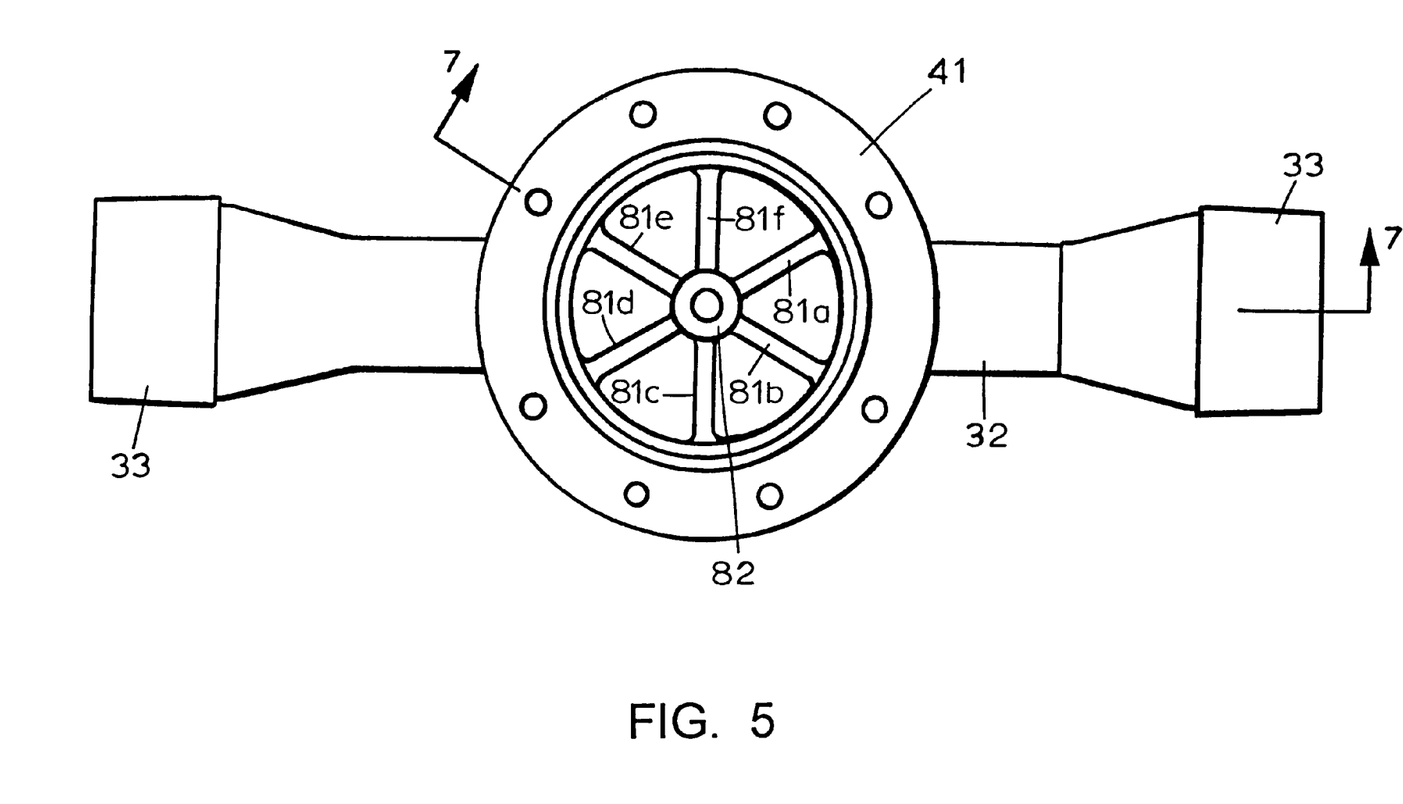
FIG. 5 is a top plan view of the carrier.
Figure 6:
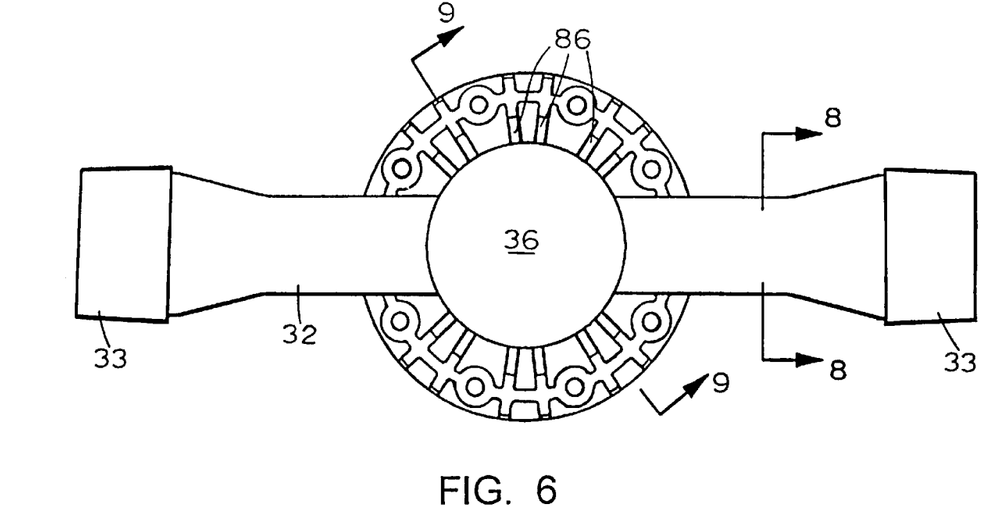
FIG. 6 is a bottom plan view of the carrier.
Figure 7:
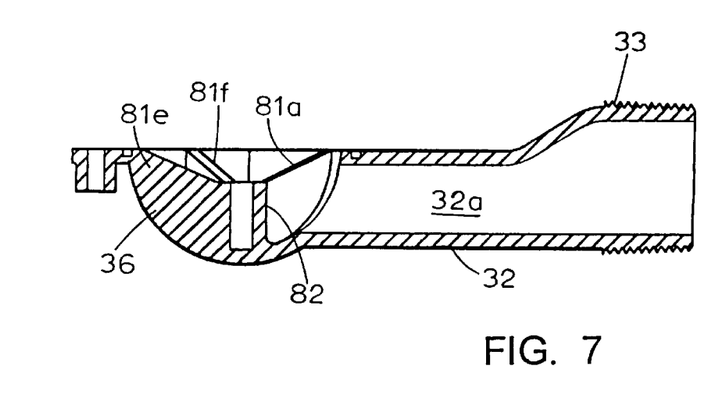
FIG. 7 is a sectional view taken on the line 7—7 of FIG. 5.

In FIGS. 5, 6 and 7, the entire plate 41 is not illustrated; instead, only an annular portion of the plate 41, surrounding the opening of the bulb 36, is shown. The annular portion may be extended to form the entire bottom wall of an enclosure as shown in FIG. 3, or a separate enclosure may be mounted on top of the annular portion as shown in FIGS. 12–15.

Figure 10:
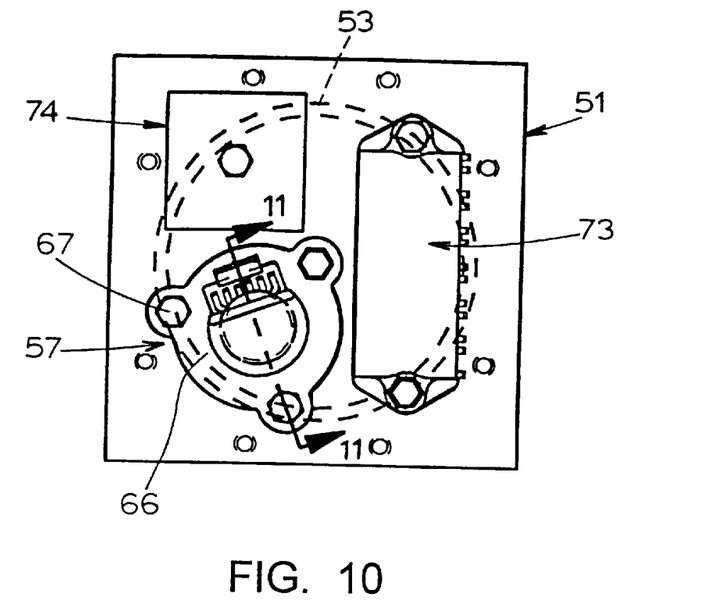
FIG. 10 is an enlarged view of part of the carrier.

A flat thermally conductive plate 51 (preferably made of metal) is positioned over the open upper side of the bulb 36 (see FIGS. 4, 10 and 11) and forms a heat sink or cold plate. Around the open upper side of the bulb 36 is an annular seal groove 52, and a seal 53 (FIGS. 4 and 10) is mounted in the groove 52 and forms a seal between the plate 41 and the underside of the cold plate 51 which in this instance is substantially square as shown in FIGS. 4 and 10. A series of holes 54 are formed in the plate 51 and in the carrier 31 radially outside the seal 53, and screws secure the plate 51 to the plate 41. A hole 56 is formed in plate 51, and a sensor 57 is mounted on the plate 51 above the hole 56.

Figure 11:
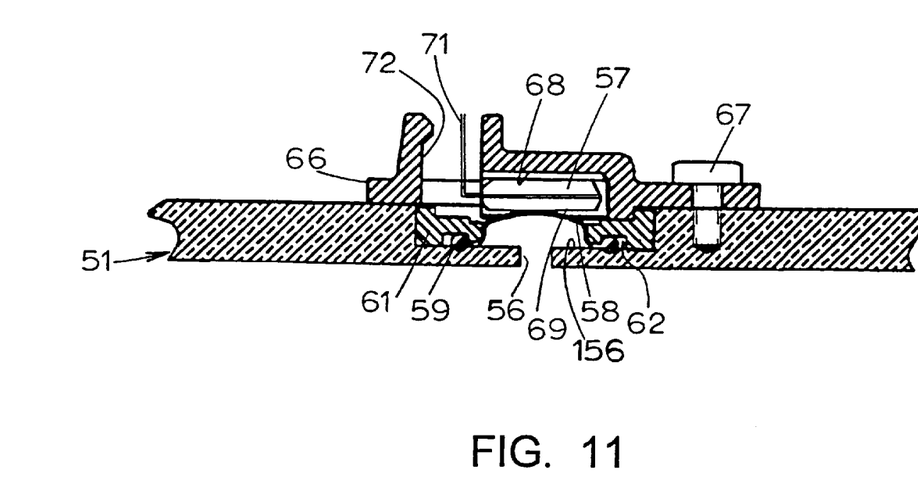
FIG. 11 is a further enlarged sectional view taken on the line 11—11 of FIG. 10.
Figure 12:
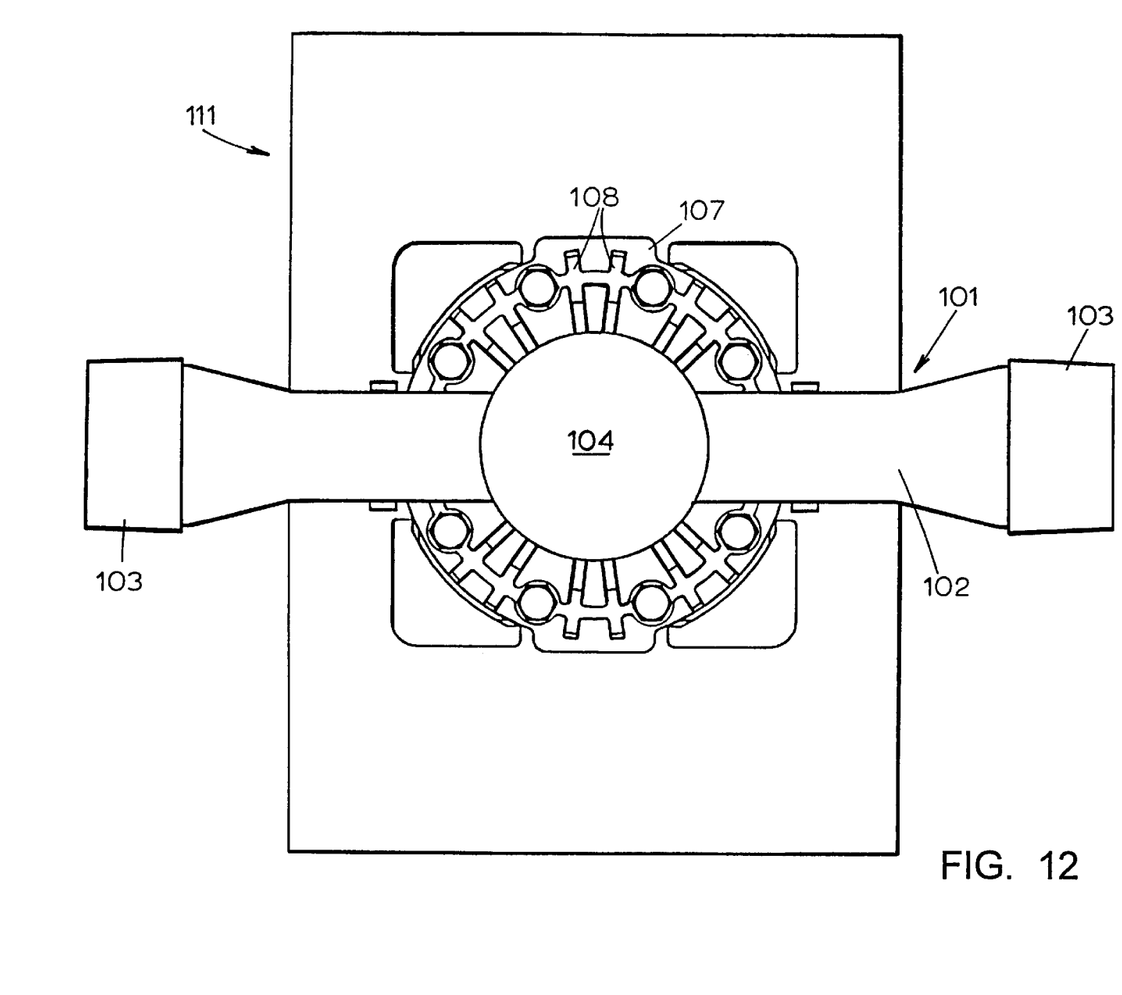
FIGS. 12 to 15 show an alternative construction of a flow carrier.
Figure 13:
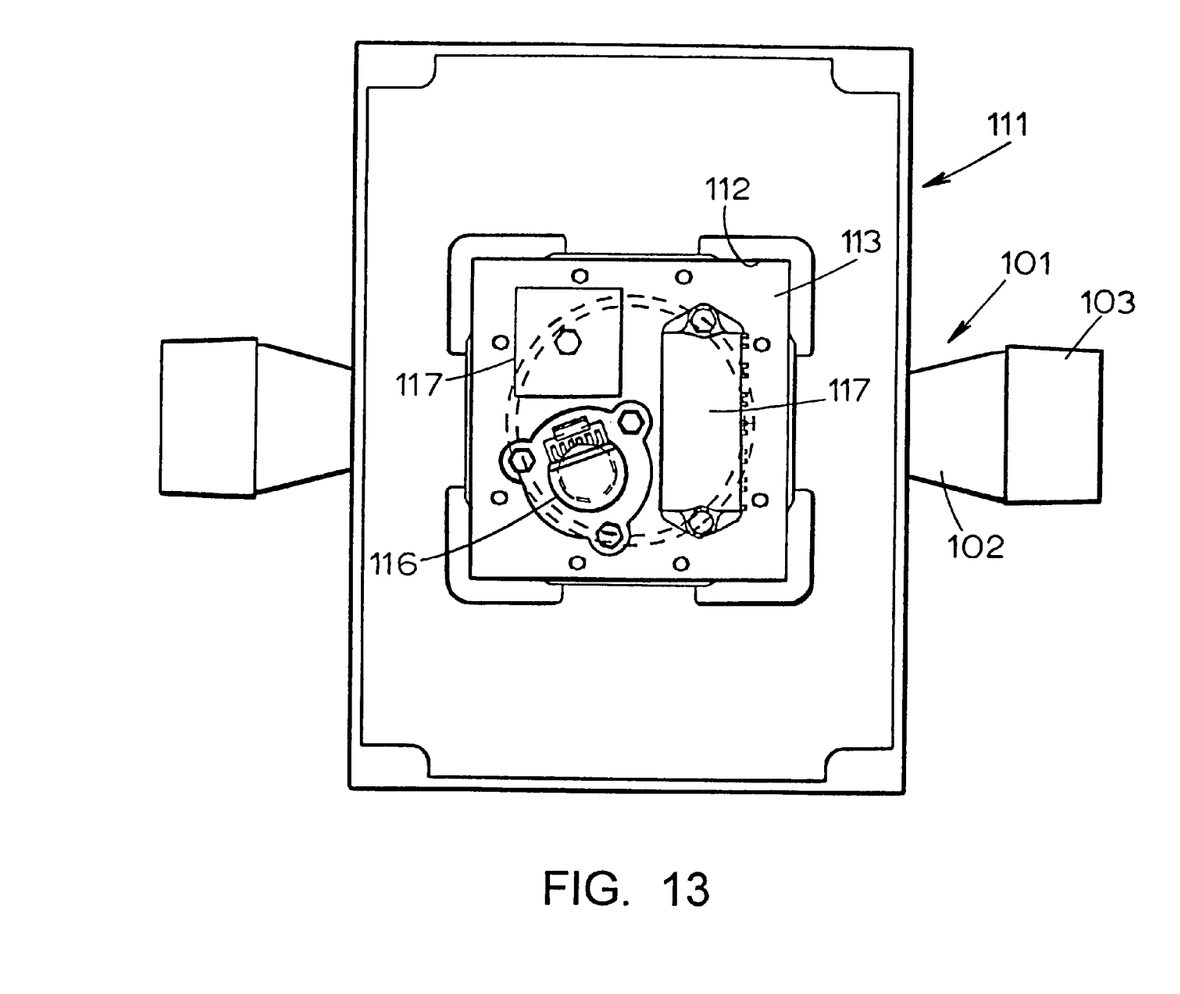
Figure 14:
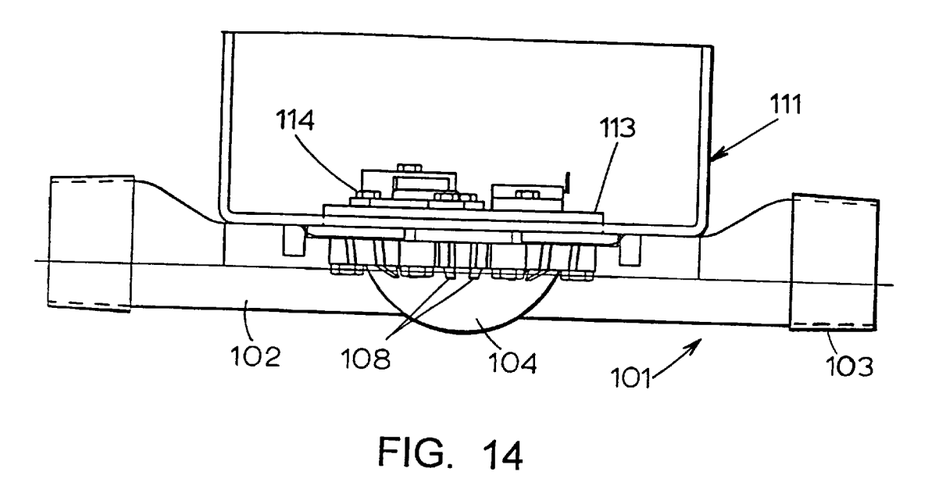
Figure 15:
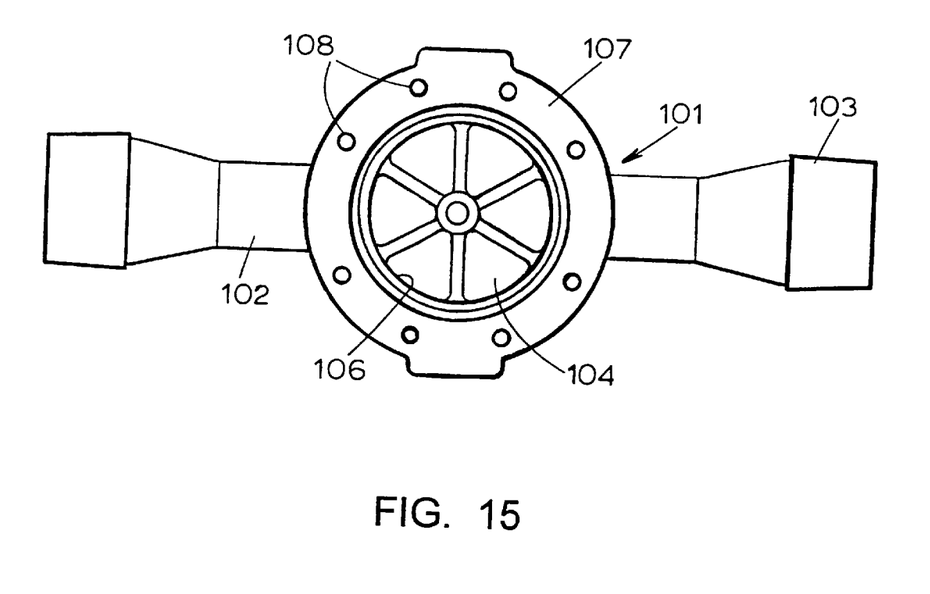

In the present example, the sensor 57 comprises a liquid pressure sensor best shown in FIG. 11. An annular diaphragm 58 is positioned over the upper side of the hole 56, and an O-ring 59 is formed integrally with the outer periphery of the diaphragm. An annular diaphragm clamp 61 is positioned over the outer periphery of the diaphragm 58 and a groove 62.in the clamp receives the O-ring 59, thereby forming a seal around the hole 56, between the lower surface or side of the plate 51 and the upper surface or side of the plate. As a result, the annular diaphragm 58 has a wet side in contact with the liquid and a dry side not in contact with the liquid. As shown in FIG. 4 and best shown in FIG. 11, the plate 51 includes an area surrounding the hole 56 engaged by the O-ring 59 such that portions of the upper side of the plate 51 not within the area are isolated from the liquid. As further shown in FIGS. 4 and 11, the area may be a recessed area 156.

A sensor cup 66 is positioned over the diaphragm clamp 61 and is secured to the plate 51 by screws 67, the cup 66 serving to hold the clamp 61 and the diaphragm 58 on the plate 51. As shown in FIG. 11, the cup 66 forms a cavity 68 which entirely contains and holds the sensor 57 which has a pressure sensitive side which is positioned against the upper side of the diaphragm 58. As further shown in FIG. 11, the cup 66 holds the sensor 57 in a substantially stationary position.

The sensor 57, in this specific example, is a pressure sensor that produces an analog electric signal which is representative of the liquid pressure. The bottom side 69 of the sensor is flexible and is pressed upwardly by the liquid pressure acting on the diaphragm 58. The sensor may, for example, include a variable resistance strain gauge, or variable resistor connected in a Wheatstone bridge arrangement. Electrical leads 71 are connected to the sensor 57 and extend out of the cup 66 through an opening 72.

The control 47 further includes electronic components 73 and 74 which are secured to the upper dry side of the plate 51 by screws 76. The components 73 and 74 are power components which generate heat during use, and they are part of the control circuit for the motor 12. In the present example, the control circuit comprises a conventional DC link arrangement and the motor 12 is a three-phase synchronous variable speed motor. The component 74 comprises an AC to DC rectifier and the component 73 comprises a DC to variable frequency AC inverter. The power supply 24 (FIG. 1) is connected to the rectifier 74 and the output of the inverter 73 is connected to the drop cable 17 and to the motor 12. The pressure sensor 57 has its output signal connected in the DC link to control the frequency of the inverter output. The DC link preferably also includes ramp circuits, as is well known to those skilled in this art. The specific construction of the motor control circuit does not form part of the present invention; the control circuit may have the construction disclosed in U.S. Pat. No. 5,580,221 titled "Motor Control Circuit" for Pressure Control of a Pumping System, the disclosure of which is incorporated herein by reference.

It is an important feature of the present invention that the components in need of cooling are mounted directly on the upper side (the dry side) of the cold plate 51 and that the bottom side (the wet side) of the plate 51 is directly exposed to the liquid flowing through the conduit 32, and that the components in need of cooling control the motor 12 and the flow of the cooling liquid. Consequently, the cooling liquid flows while the components are generating heat. Further, the invention utilizes as a coolant a liquid which is being circulated for another purpose (i.e., the invention does not require a separate dedicated cooling arrangement). Further, the liquid acts essentially directly on the sensor 57 because only the diaphragm 58 is interposed between them.

The semi-spherical dome or bulb 36 forms a relatively large opening and therefore the plate 51 has a large surface area in contact with the cooling liquid. FIGS. 3, 5, 7 and 9 show that the interior of the bulb includes a plurality of radial ribs 81a to 81f and a center post portion 82 which connects the radially inner ends of the ribs. As shown, for example, in FIG. 3, the radially outer ends of the ribs 81a and 81b connect with the bulb 36 on opposite sides of the inlet flow area of the conduit 32, and the ribs 81d and 81e also connect with the bulb 36 on opposite sides of the outlet flow area of the conduit 32. As shown in FIG. 7, the upper edges of the ribs taper downwardly toward the post 82 and are spaced from the lower side of the plate 51. The liquid enters the bulb 36 between the ribs 81a and 81b, flows through the flow area between the upper edges of the ribs and the plate 51, and flows out of the bulb between the ribs 81d and 81e. The flow area between the plate 51 and the upper edges of the ribs is preferably less than the flow area 32a (see FIG. 8) of the conduit 32, whereby the velocity of the liquid flow is increased underneath the plate 51. Further, the relatively large opening of the upper side of the bulb forms a relatively large area of the plate where the liquid cools (or draws heat away from) the plate 51. For example, the diameter of the opening of the bulb 36 is preferably in the range of from 1.5 to 5.0 times the outer diameter of the conduit 32. In addition to accelerating the liquid flow, the ribs also serve to strengthen the bulb. A plurality of radially extending strengthening ribs 86 (FIGS. 2 and 6) may also be formed on the exterior of the bulb.

Apparatus in accordance with the invention also has the following listed advantages:

1. A single integral package includes a control, heat sink and sensor.

2. It may be installed using ordinary plumbing tools.

3. It is compact in size but is high in cooling efficiency per unit area.

4. There is a direct sensing of liquid pressure by a mechanical-electrical pressure transducer or sensor.

5. It includes a one-piece flow carrier with liquid flow acceleration ability and ease of assembly.

6. A combined heat sink and pressure sensor are mounted in the same unit.

7. The sensor, electronic components and heat sink are concealed inside the module or package.

8. The package may be used with any type of piping system, such as metal or plastic.

FIGS. 12 through 15 show an alternative construction of the flow carrier and the housing for the power or control module and the pressure sensor. Whereas in FIGS. 1 to 11, the bottom part of the housing is formed integrally with the flow carrier, in the embodiment shown in FIGS. 12 to 15 they are separately formed.

The flow carrier 101 of FIGS. 12 to 15 comprises a tubular conduit 102 having threaded coupling portions 103 at its ends and a semi-spherical bulb 104 at its center. The upper side of the bulb 104 forms a round opening 106 and a generally circular flange 107 is formed around the opening 106. Exterior reinforcing ribs 108 (FIGS. 12 and 14) are formed on the underside of the flange, between the flange and the bulb. A ring of mounting holes 108 are formed in the flange 107.

The upper side of the flange 107 and the adjacent portions of the conduit 102 are flat, and the bottom wall of a housing 111 is positioned on the flat surface. An opening 112 having the shape of a cold plate 113 is formed in the bottom wall of the housing, and the plate 113 plus the housing 111 are secured to the carrier by bolts 114. A pressure sensor 116 and heat generating power control components 117 (FIG. 13) are mounted on the control plate 113, as described in connection with FIGS. 2 to 11. While not illustrated, a cover is preferably mounted over the upper side of the housing 111. In other respects, the embodiment of the invention shown in FIGS. 12 to 15 is essentially the same as that shown in FIGS. 2 to 11 and has similar advantages.

It will be apparent from the foregoing that novel and useful apparatus is described and illustrated. The apparatus forms a compact package or module for sensing the pressure of liquid being pumped and for cooling heat generating components of a control system. The control system is operable to control a motor-pump unit which moves the liquid through the apparatus, whereby the liquid being pumped is utilized to cool the control system. The pressure sensor is directly responsive to the liquid pressure and the components to be cooled are directly mounted on a heat sink which also supports the pressure sensor. Further, the flow carrier is shaped to accelerate the liquid flow across the heat sink for liquid cooling of the heat sink and the components. The pressure sensor includes an improved diaphragm having an O-ring integrally molded on its outer periphery, for forming a seal around the diaphragm.

What is claimed is:

1. Pressure sensing apparatus for use in a liquid pumping system, said liquid pumping system including a flow passage for a liquid, said apparatus comprising:
   a) a flexible diaphragm having an outer periphery, a wet side in contact with said liquid and a dry side;
   b) seal means at said outer periphery of said diaphragm;
   c) a plate having a first side and a second side, said first side being exposed to said liquid in said flow passage and said plate having an opening from said second side to said first side and an area surrounding said opening;
   d) said diaphragm being positioned in said area over said opening such that said seal means engages said area;
   e) a pressure sensor having a flexible side in contact with said dry side of said diaphragm;
   f) cup means secured to said second side of said plate and entirely containing said pressure sensor to hold said pressure sensor against said diaphragm in a substantially stationary position; and
   g) clamp means positioned in said area and engaged by said cup means to hold said seal means sealingly engaged with said plate in said area.

2. Pressure sensing apparatus as set forth in claim 1, wherein said diaphragm has a bowl shape and said seal means comprises an O-ring, and said diaphragm has a substantially uniform thickness.

3. Pressure sensing apparatus as set forth in claim 1, wherein said seal means is integrally formed with said outer periphery of said diaphragm, and said seal means and said outer periphery are substantially circular.

4. Pressure sensing apparatus as set forth in claim 1, wherein said area in said plate is recessed.

5. Pressure sensing apparatus as set forth in claim 1, wherein portions of said second side of said plate not within said area are isolated from said liquid.

6. Pressure sensing apparatus as set forth in claim 1, wherein said cup means comprises an opening through which electrical leads connected to said pressure sensor extend out of said cup means.

7. Pressure sensing apparatus for use in a liquid pumping system, said liquid pumping system including a flow passage for a liquid, said apparatus comprising:
   a) a flexible diaphragm having an outer periphery, a wet side in contact with said liquid and a dry side;
   b) seal means at said outer periphery of said diaphragm;
   c) a plate having a first side and a second side, said first side being exposed to said liquid in said flow passage and said plate having an opening from said second side to said first side and an area surrounding said opening;
   d) said diaphragm being positioned in said area over said opening such that said seal means engages said area and such that portions of said second side of said plate not within said area are isolated from said liquid;
   e) a pressure sensor having a flexible side in contact with said dry side of said diaphragm;
   f) clamp means positioned in said area and holding said seal means sealingly engaged with said second side of said plate; and
   g) cup means secured to said second side of said plate, said cup means entirely containing said pressure sensor and securing said clamp means to said plate in said area to hold said seal means sealingly engaged with said plate.

8. Pressure sensing apparatus as set forth in claim 7, wherein s aid cup means holds said pressure sensor against said dry side of said diaphragm such that said pressure sensor is substantially stationary in position.

9. Pressure sensing apparatus as set forth in claim 8, wherein said diaphragm has a bowl shape and said seal means comprises an O-ring.

10. Pressure sensing apparatus as set forth in claim 9, wherein said seal means is integrally formed with said outer periphery of said diaphragm.

11. Pressure sensing apparatus as set forth in claim 7, wherein said cup means comprises an opening through which electrical leads connected to said pressure sensor extend out of said cup means.

12. Pressure sensing apparatus for use in a liquid pumping system, said liquid pumping system including a flow passage for a liquid, said apparatus comprising:
   a) a flexible diaphragm having a wet side in contact with said liquid and a dry side;
   b) a member having a first surface and a second surface, said first surface being exposed to said liquid in said flow passage and said member having an opening from said second surface to said first surface and an area surrounding said opening;
   c) a pressure sensor in contact with said dry side of said diaphragm wherein said pressure sensor produces an electric signal representative of the pressure of said liquid in said flow passage;
   d) a clamp that positions said diaphragm in said area over said opening such that portions of said second surface of said member not within said area are isolated from said liquid; and
   e) a cup secured to said second surface of said member wherein said cup entirely contains said pressure sensor and secures said clam to said member in said area.

13. The pressure sensing apparatus as set forth in claim 12, wherein said cup holds said pressure sensor against said dry side of said diaphragm such that said pressure sensor is substantially stationary in position.

14. The pressure sensing apparatus as set forth in claim 12, wherein said pressure sensor comprises a variable resistance strain gauge.

15. Pressure sensing apparatus as set forth in claim 12, wherein said cup comprises an opening through which electrical leads connected to said pressure sensor extend out of said cup.

* * * * *